US010466696B2

(12) United States Patent
Hardee et al.

(10) Patent No.: US 10,466,696 B2
(45) Date of Patent: Nov. 5, 2019

(54) METHODS AND SYSTEMS FOR MANAGING DRONES IN REGULATED SPACES

(71) Applicant: INTERNATIONAL BUSINESS MACHINES CORPORATION, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 15/335,637

(22) Filed: Oct. 27, 2016

(65) Prior Publication Data
US 2018/0120836 A1    May 3, 2018

(51) Int. Cl.
*G05D 1/00* (2006.01)
*B64C 39/02* (2006.01)

(52) U.S. Cl.
CPC ......... *G05D 1/0055* (2013.01); *B64C 39/024* (2013.01); *G05D 1/0011* (2013.01); *B64C 2201/146* (2013.01)

(58) Field of Classification Search
CPC .. G05D 1/0055; G05D 1/0011; B64C 39/024; B64C 2201/146
See application file for complete search history.

(56) References Cited

U.S. PATENT DOCUMENTS

| 8,082,102 | B2* | 12/2011 | Ravenscroft ......... | G01C 21/005 |
| | | | | 701/2 |
| 9,102,406 | B2 | 8/2015 | Stark et al. | |
| 9,256,225 | B2 | 2/2016 | Downey et al. | |
| 2016/0202695 | A1* | 7/2016 | Deroos ............... | G05D 1/0011 |
| | | | | 701/2 |
| 2019/0103030 | A1* | 4/2019 | Banga ................... | B64C 39/024 |
| 2019/0172357 | A1* | 6/2019 | Meuleman ............ | B64C 39/024 |

FOREIGN PATENT DOCUMENTS

WO    2016130994 A1    8/2016
WO    WO2016154936 A1 *  10/2016

OTHER PUBLICATIONS

Branch et al., "A Design Study for the Safe Integration of Unmanned Aerial Systems into the National Airspace System," 2016 IEEE Systems and Information Engineering Design Conference (SIEDS '16), 2016 (6 pages).

(Continued)

*Primary Examiner* — Christian Chace
*Assistant Examiner* — Edward Torchinsky
(74) *Attorney, Agent, or Firm* — Griffiths & Seaton PLLC

(57) ABSTRACT

Embodiments for managing drones by a processor are described. A drone is detected traveling toward a regulated space. During the detecting of the drone, the drone is being controlled by a first control system. The control of the drone by the control system is interrupted such that the drone does not travel into the regulated space while being controlled by the first control system. The drone is controlled with a second control system such that the drone travels into the regulated space.

18 Claims, 7 Drawing Sheets

(56) References Cited

OTHER PUBLICATIONS

Gurriet et al., "Towards a generic and modular geofencing strategy for civilian UAVs," 2016 International Conference on Unmanned Aircraft Systems (ICUAS), Jun. 7-10, 2016 (10 pages).

Anonymous, "Method for Drone Traffic Control in Cloud," An IP.com Prior Art Database Technical Disclosure, IP.com No. IPCOM000243428D, Sep. 21, 2015 (4 pages).

Motorola et al., "New method to implement Geofencing," An IP.com Prior Art Database Technical Disclosure, IP.com No. IPCOM000246445D, Jun. 7, 2016 (4 pages).

Motorola et al., "Method to automatically setup a defensive Geofence for vulnerable objects nearby an event," An IP.com Prior Art Database Technical Disclosure, IP.com No. IPCOM000247203D, Aug. 16, 2016 (4 pages).

* cited by examiner

METHODS AND SYSTEMS FOR MANAGING DRONES IN REGULATED SPACES

BACKGROUND OF THE INVENTION

Field of the Invention

The present invention relates in general to computing systems, and more particularly, to various embodiments for managing drones in or near regulated spaces.

Description of the Related Art

The use of drones, such as unmanned aerial vehicles (UAVs), has become increasingly prevalent in recent years. Besides recreational use, drones are now performing commercial and military tasks such as, for example, monitoring areas (e.g., for security purposes), searching areas for missing people and/or items, and visual productions (e.g., filming and photography). Additionally, it is expected that drones will be used to make deliveries in the near future (e.g., to deliver ordered products and/or items shipped from one location to another).

One of the problems associated with the use of drones for these tasks is that, for various reasons, it is undesirable for drones (e.g., UAVs) to travel in certain areas, at least during particular periods of time. For example, due to security and/or safety concerns, it is generally agreed that (at least some) UAVs should not be able to fly within a close proximity to airports and military installations. Additionally, even when not particularly close to an airport or military installation, due to, for example, aircraft flight paths, it may be desirable to restrict the altitude at which UAVs are permitted to fly. Further, because of privacy concerns, some people and/or neighborhoods may decide they simply do not want UAVs flying nearby.

Ideally, drones, such as UAVs, would be controlled and/or managed in such a way that when traveling in certain areas, their movements could be limited in such a way to appease the various security, safety, and privacy concerns that may otherwise exist.

SUMMARY OF THE INVENTION

Various embodiments for managing drones by a processor are described. In one embodiment, by way of example only, a method for managing drones, again by a processor, is provided. A drone is detected traveling toward a regulated space. During the detecting of the drone, the drone is being controlled by a first control system. The control of the drone by the first control system is interrupted such that the drone does not travel into the regulated space while being controlled by the first control system. The drone is controlled with a second control system such that the drone travels into the regulated space.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
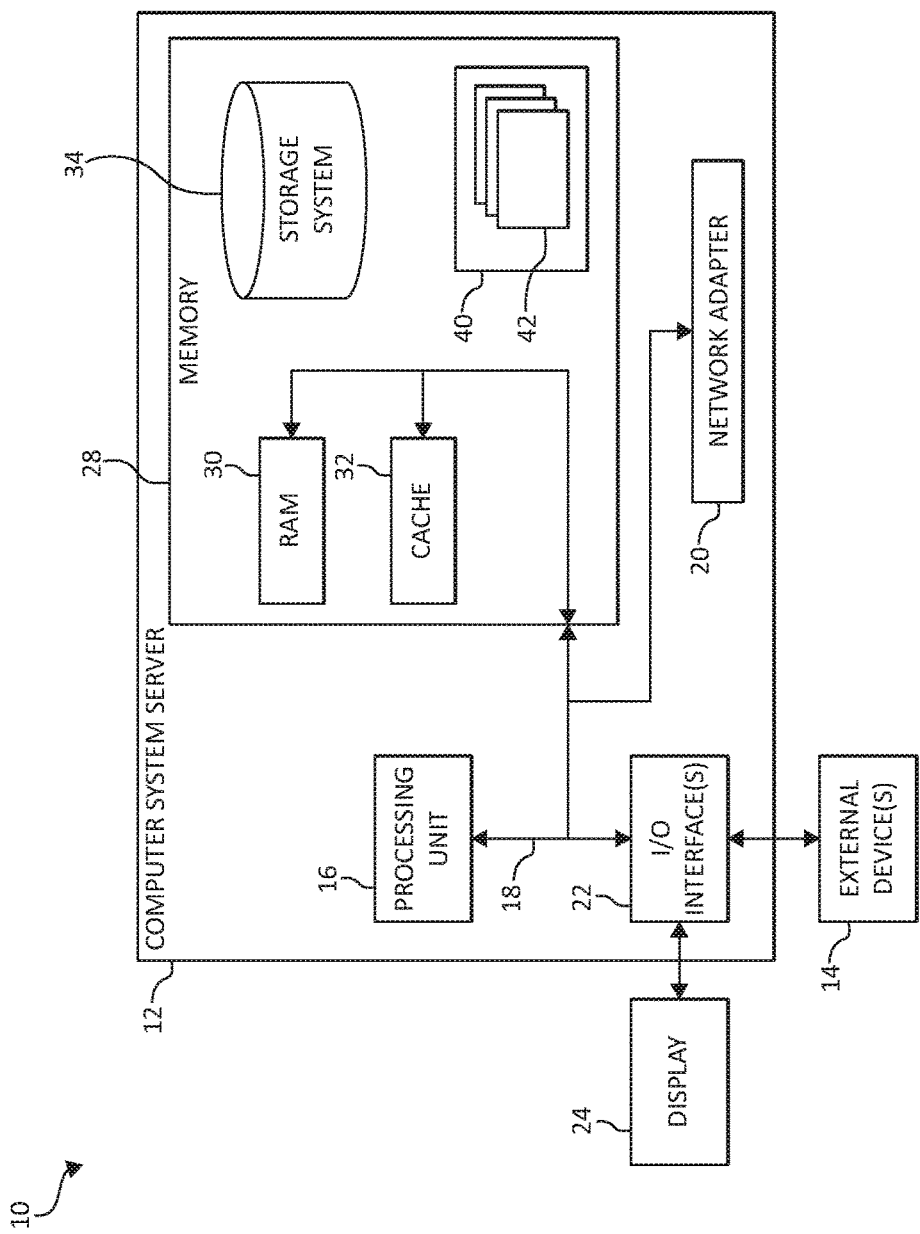
FIG. 1 is a block diagram depicting an exemplary computing node according to an embodiment of the present invention.

As previously indicated, one of the problems associated with the increasing use of drones, such as unmanned aerial vehicles (UAVs), is that it is undesirable for drones to travel in certain areas, at least under particular circumstances.

Consider an example in which a UAV is scheduled to deliver a product (e.g., ordered through a website) to an address near, or within, an airport. Due to security and safety concerns, it may be undesirable to allows the UAV to fly near, or within, the airspace, at least when being controlled by a system and/or personnel not associated with the airport. As such, in such a situation, the delivery may have to be rescheduled to be performed by, for example, a ground vehicle or to a secondary delivery address.

As another example, imagine a drone that has been scheduled to travel through a relatively large restricted airspace that has been designated around a military installation. Because of heightened security, it may be altogether forbidden for the drone to travel into any portion of the airspace, regardless of the party that is controlling the drone.

In view of the foregoing, a need exists for drone management methods and systems in which the regular control system for the drones is overridden by another control system that controls the drone in a manner permissible given the requirements of regulated spaces.

To address these needs, the methods and systems of the present invention interrupt the control of the drone performed by the standard (or primary) control system when a drone is detected as traveling towards, or into, a regulated space. In some embodiments, a control system associated with the regulated space (a secondary control system) takes control of the drone such that the drone does not enter the regulated space under the control of the primary control system. The secondary control system may cause (or control) the drone to travel into the regulated space, retain control of the drone while the drone remains in the regulated space, and cause the drone to travel out of the regulated space. When the drone leaves the regulated space, the secondary control system may relinquish control of the drone so that the drone is again under the control of the primary control system.

In some embodiments, a message is generated and sent to the primary control system, indicating that the primary control system's control of the drone has been interrupted by the secondary control system.

In some embodiments, the drone is a UAV. However, it should be understood that the methods and systems described herein may also be applied to ground-based drones, such as driverless cars and trucks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, for example, an aircraft control tower, military installation, or a drone (e.g., UAV). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
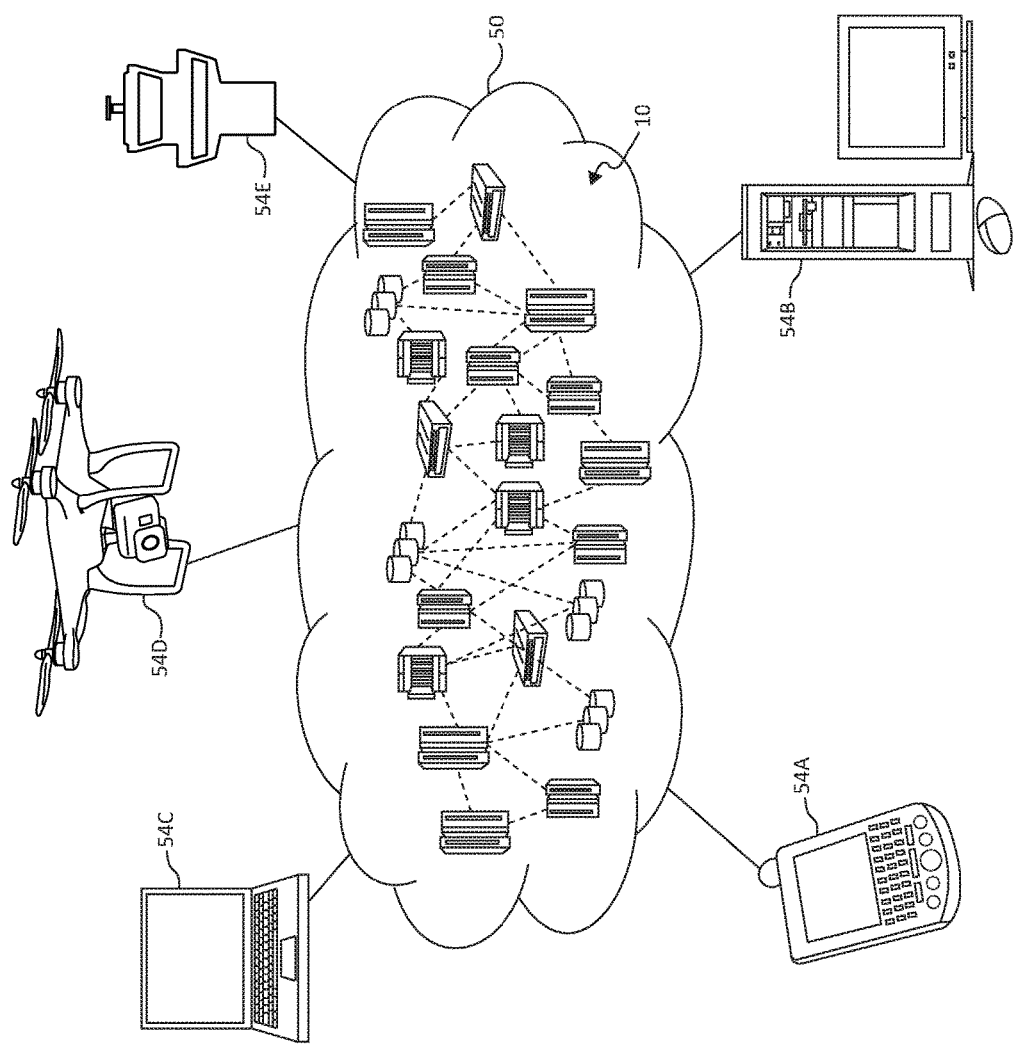
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and drone management computer systems, such as, for example, those in drones 54D and/or aircraft control towers 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
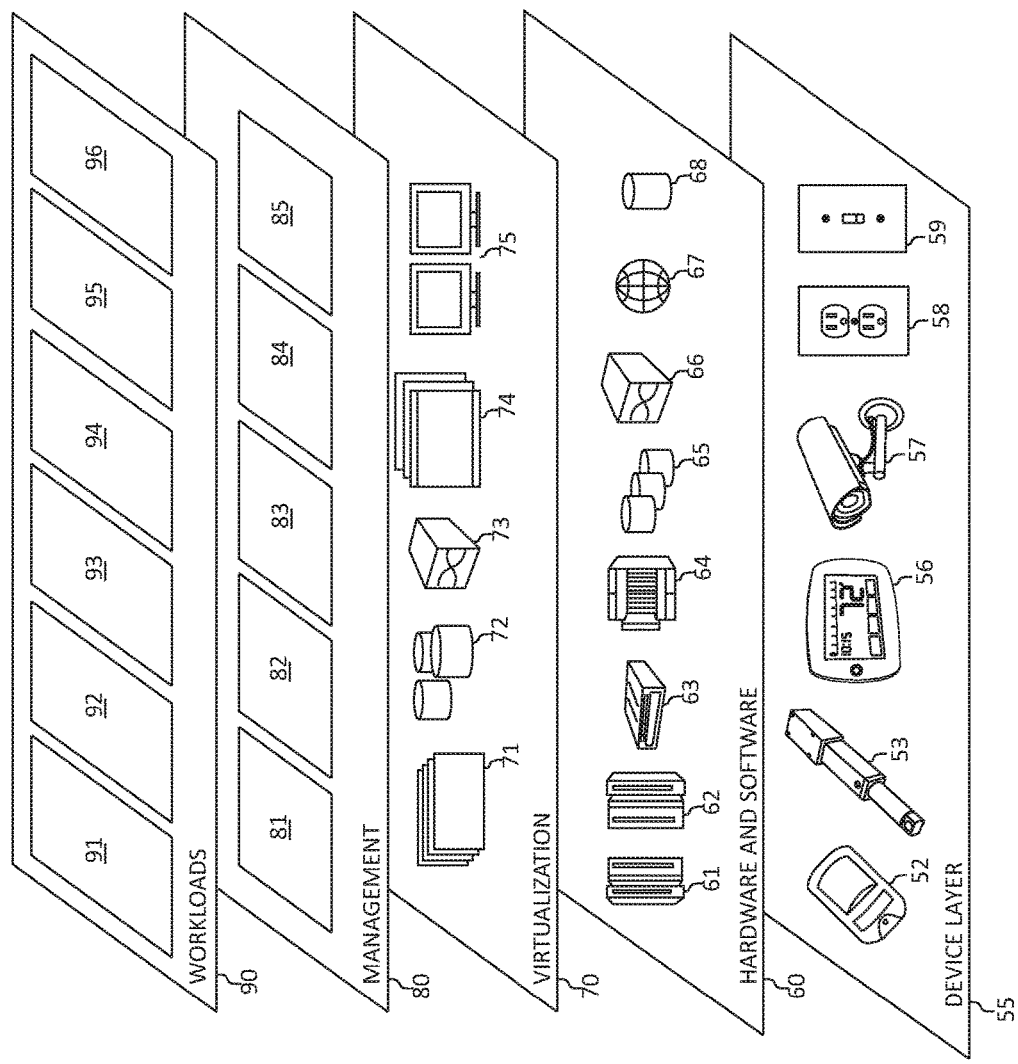
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UAVs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, particularly when traveling in, or near, regulated spaces. The methods and systems include a data collection aspect, where a variety of information may be collected about drones (e.g., ownership of the drone, destinations of the drone, and delivery points of the drones) and any regulated spaces in the general vicinity of the drones. Additionally, the information may include, for example, the current date/season and weather data (e.g., temperature, chance of precipitation, etc.) associated with the region(s) in which the drones are to travel. In some embodiments, the system(s) described herein control the drones in the manner (s) described below and/or otherwise enable or cause the various functionalities described to be performed.

Figure 4:
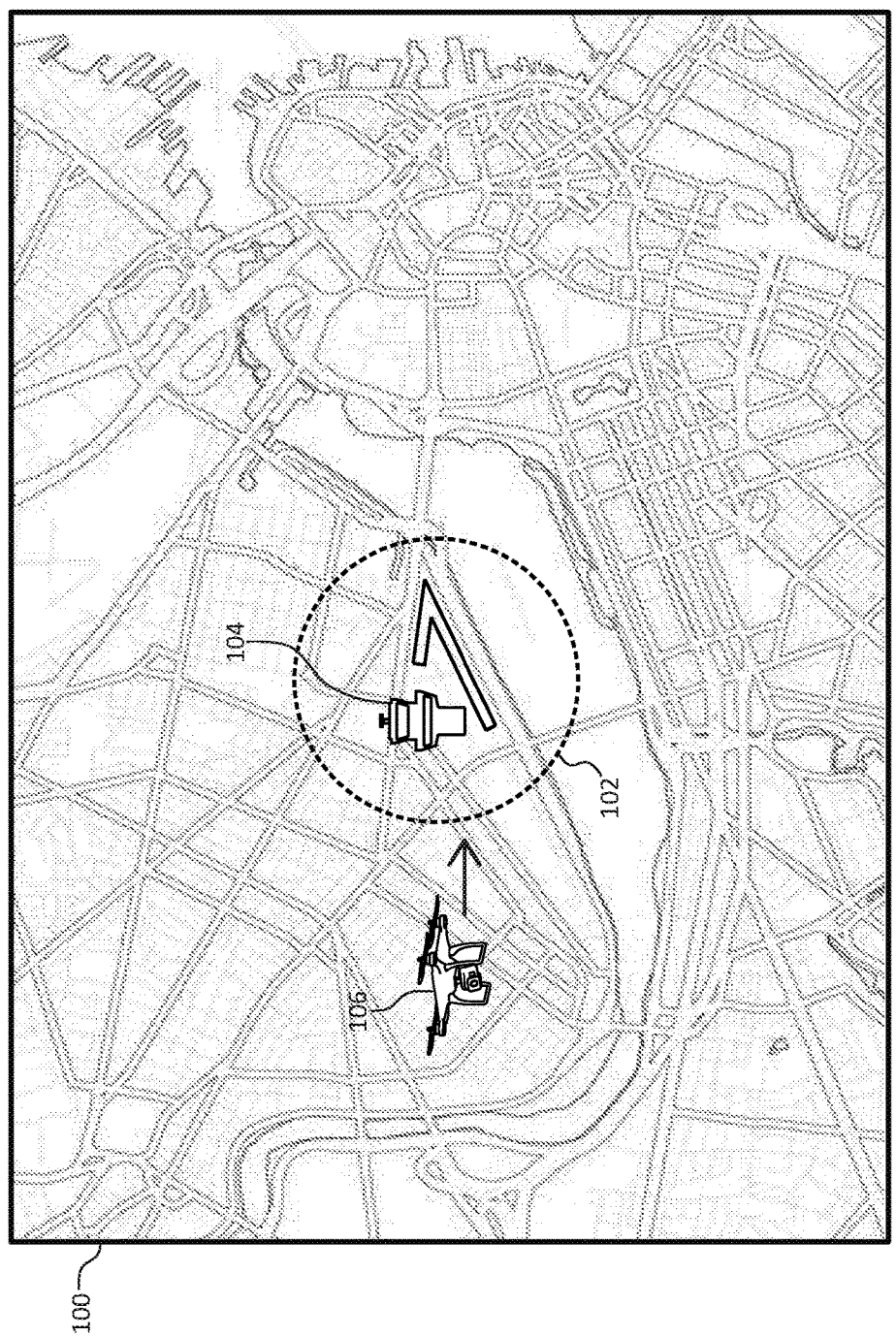
FIGS. 4-6 are plan views of a map showing a drone traveling through a regulated space.

Referring to FIG. 4, a map 100 of a particular geographic region is shown. On the map 100, a regulated space 102 within the region is shown. The regulated space 102 may be, for example, any defined (or established or predetermined) region, or any space above a such a region (i.e., an airspace), in which it is has been deemed to be undesirable to allow drones (e.g., UAVs) to travel within, at least when under the control of systems not associated with the regulated space (i.e., not in control of the party controlling the drone activity of the regulated space) and/or under specific circumstances.

In the particular embodiment shown, the regulated space 102 is essentially in the shape of a circle in which an airport 104 is positioned. However, it should be understood that the regulated spaces described herein may be defined or assigned at any location and may be in different shapes, and may be associated with particular altitudes (i.e., in embodiments related to aerial drones). For example, the regulated spaces may be associated with (e.g., defined around) military installations or particular portions of a city (e.g., neighborhoods in which the residents have decided they do not want drones freely travelling near their homes).

It should also be understood that the regulated spaces may only be activated under certain circumstances. For example, in some embodiments, the regulated space(s) is only activated at (or on) particular times of the day, days, seasons, etc. Further, the regulated space may be activated based on activity in the area, such as weather conditions. For example, the regulated space may be activated if the area is experiencing high winds and/or precipitation. In some embodiments, the regulated space is only related/applicable to particular types of drones. For example, the regulated space may only be related or applied to aerial drones (but not ground-based drones) or aerial drones that have cameras installed thereon. Further, the regulated space may be selectively applied to drones based on the ownership of the drone. For example, the regulated space may not be applied to drones that are recognized as being associated with a carrier known to make deliveries in that area.

Still referring to FIG. 4, a drone 106 is detected near and traveling towards the regulated space 102. The detection of the drone 106 may be made by any suitable means, such as radar, video, human observation, and/or a beacon or signal transmitted by the drone 106. As the drone 106 approaches the regulated space 102, the drone 106 is under the control of a "regular" (or primary or first) control system (e.g., the control system that normally controls the drone) such as that operated by the party owning the drone, or more generally, a computing system associated with the drone. For example, if the drone 106 is privately owned, the drone 106 may be controlled by a remote control system that is manually operated by a user (e.g., a person). However, if the drone 106 is a delivery drone (i.e., scheduled to deliver an item to a delivery point), the drone 106 may be controlled by an automated system that is owned/operated by the carrier company that owns the drone 106.

In some embodiments, before the drone 106 enters the regulated space 102, or when the drone 106 is within a certain distance of the regulated space 102, the control of the drone by the primary control system is interrupted or overridden by, for example, a control (or computer) system associated with the regulated space 102 (i.e., a secondary or second control system). In some embodiments, the secondary control system is remote from the primary control system. That is, the secondary control system may, for example, be centralized/housed at a different location, not-associated with, and/or controlled/managed by a different entity than the primary control system. For example, in the embodiment shown in FIG. 4, the secondary control system may be associated with and/or be a location in or near the airport 104 (e.g., within an aircraft control tower of the airport 104). In some embodiments, the secondary control system (at least) overrides the primary control system and prevents the drone 106 from traveling (e.g., flying) into the regulated space 102 under the control of the primary control system. For example, the secondary control system may simply override the primary control system so that the drone 106 does not travel into the regulated space 102, regardless of which control system is controlling the drone 106 or cause the drone 106 to wait for approval (e.g., from the secondary control system or personnel associated with the secondary control system) before allowing the drone 106 to travel into the regulated space 102 under the control of the primary control system.

However, as described below, in some embodiments, the secondary control system assumes control of the drone 106 and causes the drone 106 to travel into/within the regulated space 102. The system (e.g., the primary control system and/or the secondary control system may keep a record of the time and location of the drone 106 when the secondary control system assumes control of the drone 106 (and/or when the primary control system re-establishes control of the drone 106).

An indication (e.g., a message) may be sent to the primary control system (and/or a user thereof) when (or before or after) the secondary control system overrides the primary control system. The indication may simply be to alert the operators of the primary control system that the secondary control system is now in control of the drone 106. However, the indication may be accompanied with requests for information associated with the drone 106. In some embodiments, upon receiving the indication, the primary control system (and/or the operators thereof) may provide the secondary control system with information about the drone 106 and/or instructions/requests. For example, with respect to FIG. 4, if the drone 106 is a delivery drone scheduled to make a delivery at the airport 104, the primary control system may inform the secondary control system of such and provide delivery instructions (e.g., a particular delivery point at/within the airport 104). As another example, if the drone 106 is simply traveling to a destination on the other side of the airport 104, such information may be provided to the secondary control system.

In some embodiments, the indication alerts the primary control system (and/or a user thereof) that control of the drone 106 will have to be taken over by the secondary control system if the drone 106 is going to travel into the regulated space 102. In such an embodiment, the primary control system (and/or a user thereof) may be provided with the opportunity to have the drone 106 not travel into the regulated space (e.g., the user may decide to have the drone 106 avoid the regulated space 102).

In the event that the drone 106 is deemed to be unsuitable for the regulated space, changes may be made to the drone 106 before the drone 106 travels into the regulated space 102. For example, if the secondary control system is not able to assume control of the drone 106 because of the software used to control the drone 106, the appropriate software may be downloaded by (or uploaded to) the drone 106 (e.g., while the drone 106 is waiting outside of the regulated space 102). As another example, if the drone 106 has capabilities that are not allowed within the regulated space 102 (e.g., video recording equipment), those capabilities may be disabled before the drone 106 travels into the regulated space 102 (i.e., under the control of the primary control system or the secondary control system).

In some embodiments, before controlling the drone to take any substantial actions, the secondary control system verifies that it has control of the drone 106. For example, the secondary control system may check the software controlling the drone 106 to ensure that the secondary control system is in fact capable of controlling the drone 106. As another example, the secondary control system may send simple control commands to the drone 106 (e.g., hovering, ascending, descending, moving forward, etc.) and verify that the drone 106 responds appropriately. The verification may be performed using, for example, visual observation, video, radar, or any other suitable means.

Figure 5:
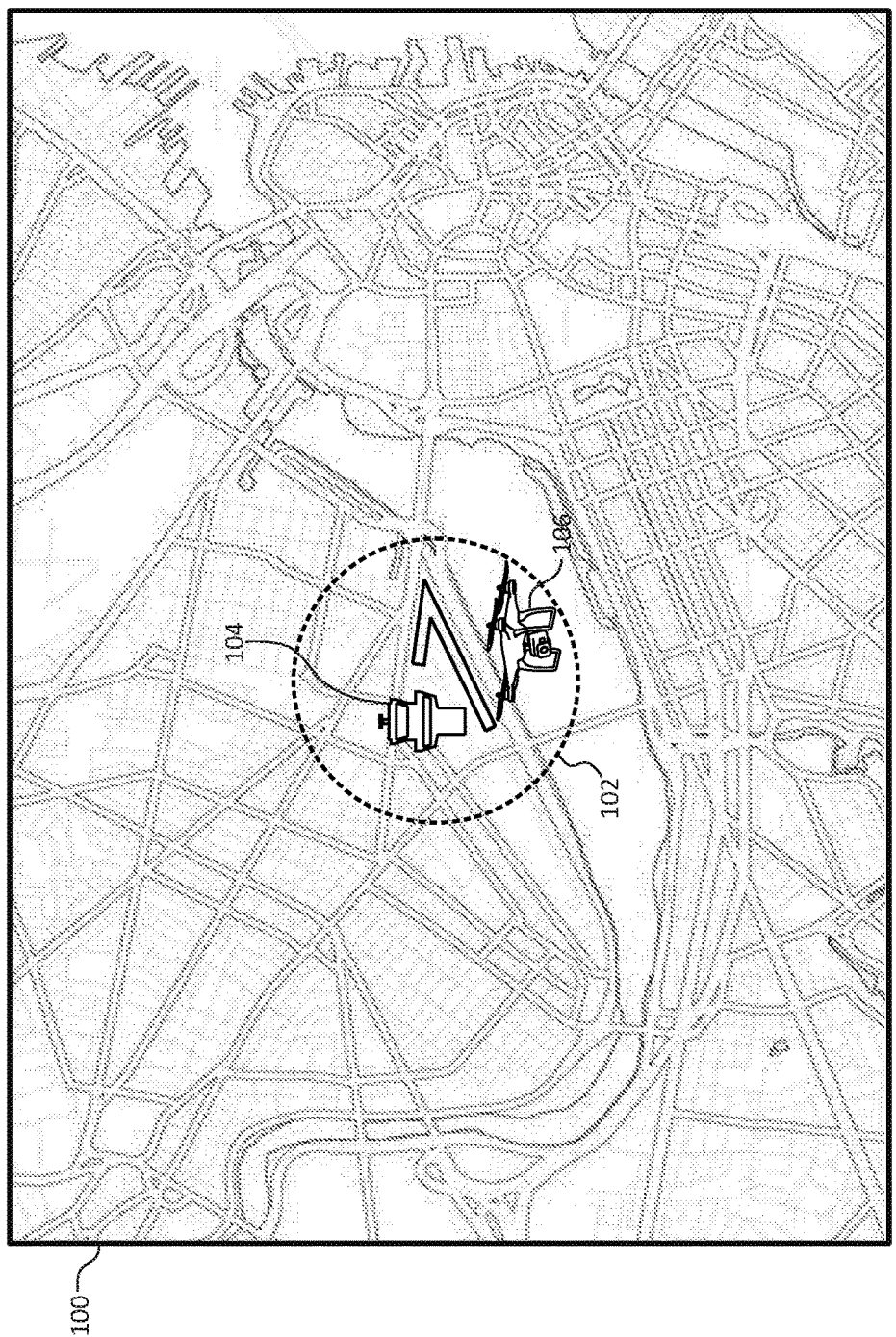

Referring now to FIG. 5, in some embodiments, after the secondary control system as assumed control of the drone 106, the secondary control system controls the drone 106 so that it travels into the regulated space 102. In some embodiments, the secondary control system retains control of the drone 106 as long as the drone 106 is in the regulated space 102 (i.e., the primary control system does not have control of the drone 106 while the drone is in, or near, the regulated space 102).

While the drone 106 is in the regulated space 102, the secondary control system may control the drone 106 in a manner based on, for example, the information provided about the drone 106 (e.g., received from the primary control system). For example, if the drone 106 is a delivery drone scheduled to make a delivery at the airport 104, the secondary control system may control the drone 106 such that the drone 106 delivers an item stored thereon to a specific delivery point at the airport 104 (e.g., a drop area near a particular building or terminal). After the delivery is made, the secondary control system may control the drone 106 so that the drone 106 leaves the regulated space 102 (e.g., from the same direction/point the drone 106 entered the regulated space 102 or a different direction/point). As another example, if the drone 106 is simply traveling to a destination on the other side of the airport 104, the secondary control system may control the drone 106 so that the drone 106 travels from one side of the regulated space 102 to another side of the regulated space 102.

Figure 6:
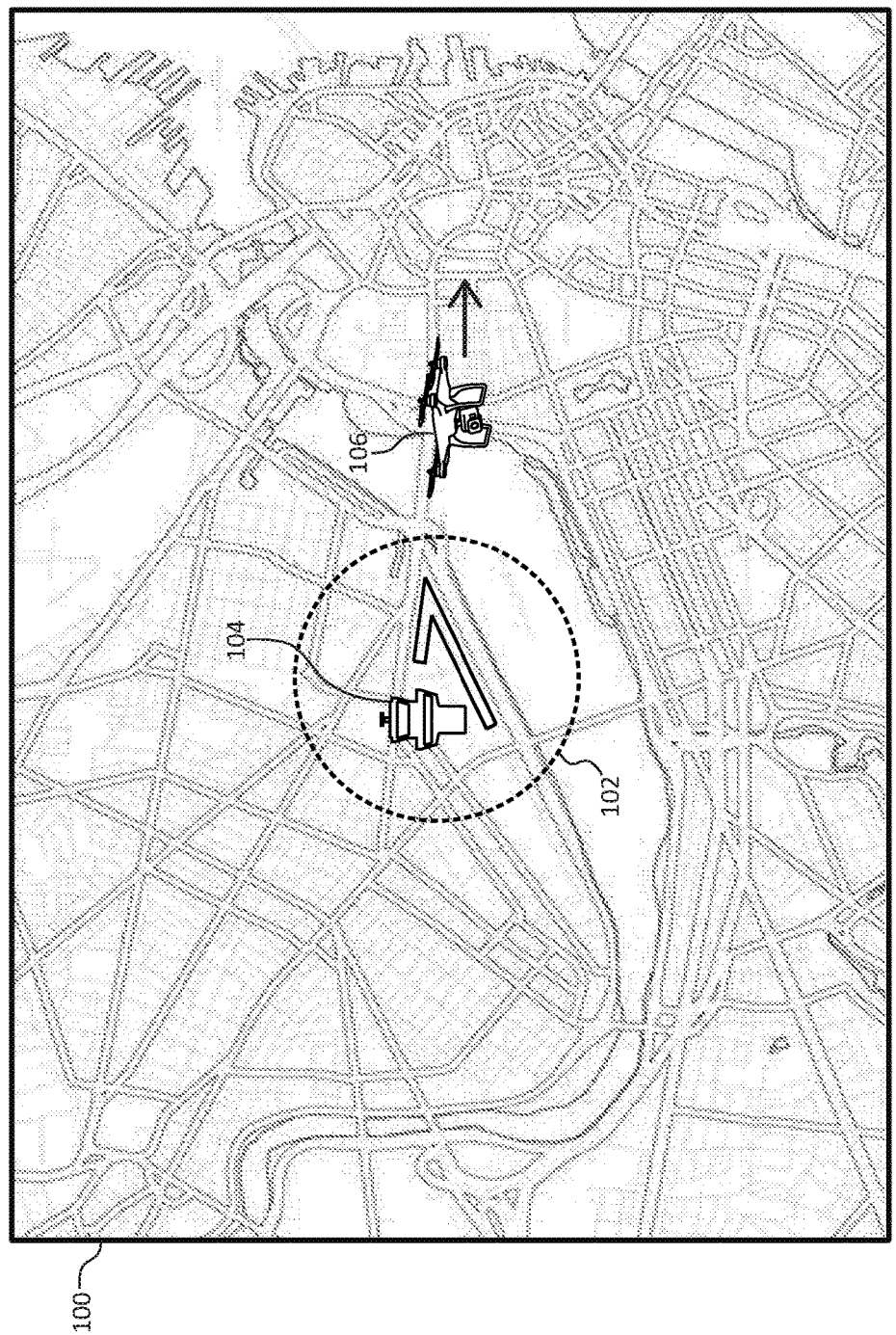

Referring to FIG. 6, in some embodiments, after the drone 106 has left the regulated space 102 (e.g., under the control of the secondary control system), the secondary control system relinquishes control of the drone 106 and/or re-establishes the control of the drone 106 by the primary control system (i.e., the primary control system regains control of the drone 106). In some embodiments, an indication is sent to the primary control system informing the primary control system that its control of the drone 106 has been re-established. After the primary control system has regained control of the drone 106, the primary control system may cause the drone to travel in an appropriate manner based on the circumstances (e.g., to the scheduled destination, back to its origination point, etc.).

Although examples described above may refer to the "primary control system" as the "regular" control system of the drone and the "secondary control system" as a control system associated with the regulated space, it should be understood that in some embodiments, the drone(s) may encounter more than one regulated space. In such instances, if the regulated spaces are adjacent (or relatively close) to each other, the two controls systems may be those associated with the regulated spaces. In other words, the control of the drone may be "handed off" from the control system of one regulated space to that of another regulated space without the owner/operator of the drone regaining control of the drone.

Figure 7:
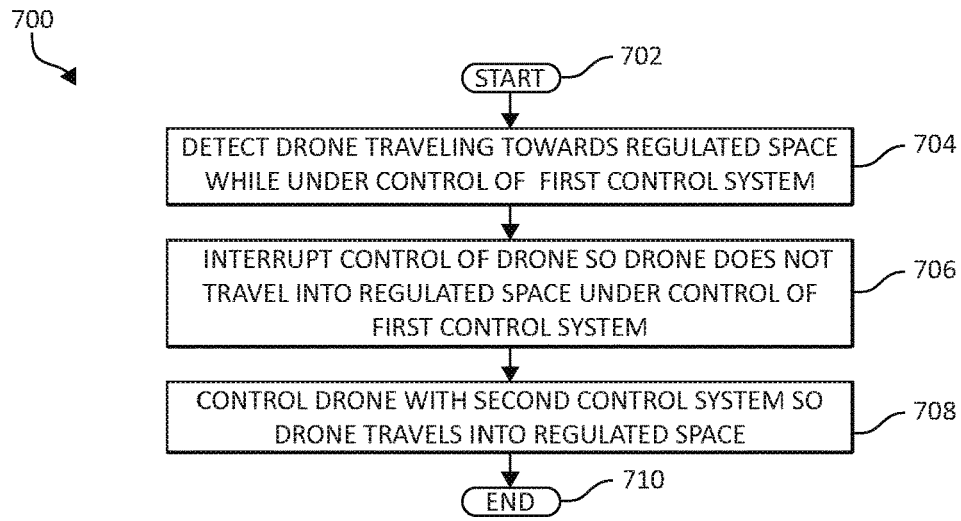
FIG. 7 is a flowchart diagram depicting an exemplary method for managing drones in which various aspects of the present invention may be implemented.

Turning to FIG. 7, a flowchart diagram of an exemplary method 700 for managing drones, in accordance with various aspects of the present invention, is illustrated. Method 700 begins (step 702) with, for example, a regulated space, such as those described above, being established (or defined or determined), as described above, and a drone traveling in the general vicinity of a regulated space while under the control of, for example, a first control system that is not associated with the regulated space (e.g., the primary control system of the drone). As described above, in some embodiments, the drone is a UAV, and the first control system may be, for example, a manual remote control system or an automated control system.

The drone is detected traveling towards (and/or near) the regulated space while under the first control system (step 704). The detection of the drone may be achieved using any suitable means, such as radar, electronic signals, video, etc. The control of the drone (e.g., by the primary control system) is interrupted so that the drone does not travel into (or within a predetermined distance of) the regulated space while under the first control system (step 706).

In some embodiments, the interrupting of the control of the drone is performed by a computing system, or secondary (or second) control system, associated with the regulated space. An indication of the interrupting of the control of the drone may be sent to the primary control system and/or information associated with the drone may be sent to the secondary control system from the primary control system. The secondary control system then assumes control of the drone and causes the drone to fly into and/or within the regulated space (i.e., under the control of the second control system) (step 708).

The method 700 ends (step 710) with, for example, the control of the drone by the first control system being re-established (and/or the second control system relinquishing control of the drone) after the drone leaves the regulated space or is directed away from the regulated space (e.g., by the first and/or second control system).

Figure 8:
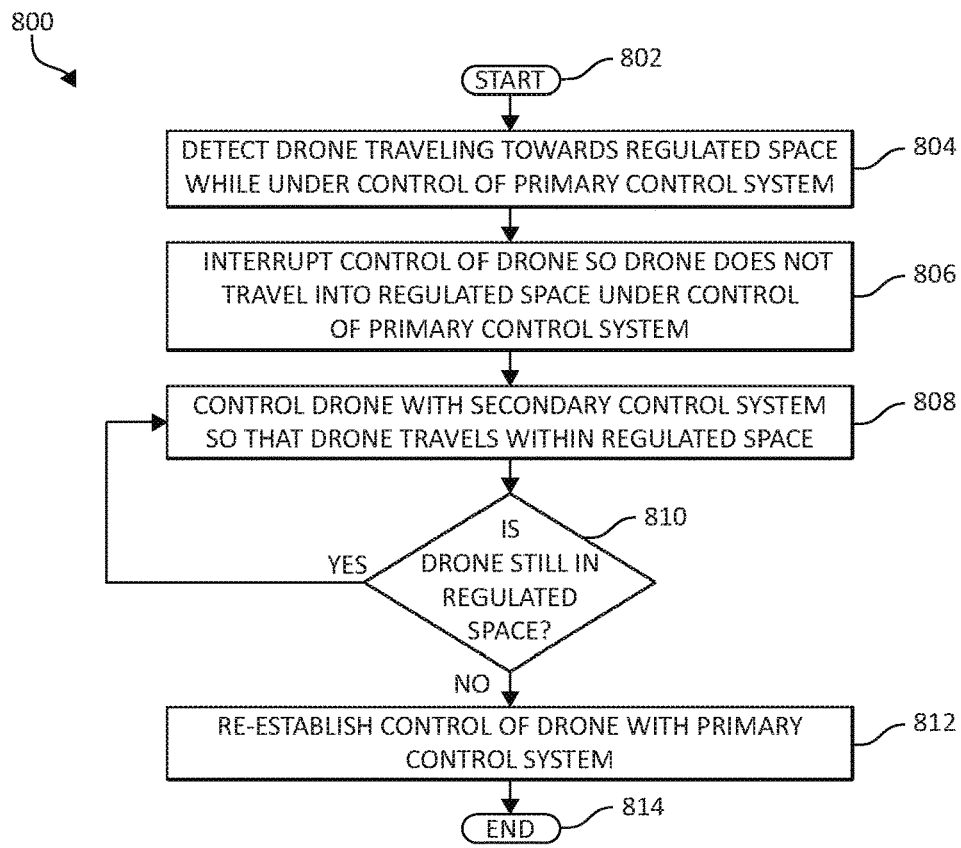
FIG. 8 is a flowchart diagram depicting an exemplary method for managing drones, again in which various aspects of the present invention may be implemented.

Turning to FIG. 8, a flowchart diagram of an exemplary method 800 for managing drones, in which additional aspects of the present invention may be implemented, is illustrated. Method 800 begins (step 802) with, for example, a regulated space, such as those described above, being established (or defined or determined), as described above, and a drone traveling in the general vicinity of a regulated space while under the control of, for example, the primary control system of the drone. As described above, in some embodiments, the drone is a UAV, and the primary control system may be, for example, a manual remote control system or an automated control system.

The drone is detected traveling towards (and/or near) the regulated space while under the control of the primary control system (step 804). The detection of the drone may be achieved using any suitable means, such as radar, electronic signals, video, etc. The control of the drone by the primary control system is interrupted so that the drone does not travel into (or within a predetermined distance of) the regulated space while under the control of the primary control system (step 806).

In some embodiments, the interrupting of the control of the drone is performed by a computing system, or secondary control system, associated with the regulated space. An indication of the interrupting of the control of the drone may be sent to the primary control system and/or information associated with the drone may be sent to the secondary control system from the primary control system.

The secondary control system causes (or controls) the drone to travel into and/or within the regulated space (step 808). As described above, in some embodiments, the secondary control system performs a requested task (e.g., delivering an item) with the drone while the drone is within the regulated space. However, the secondary control system may simply take control of the drone as the drone passes through the regulated space towards another destination.

If the drone is still in the regulated space (step 810), the secondary control system retains control of the drone (step 808). However, if the drone is no longer in the regulated space (step 810), the control of the drone with the primary control system is re-established (step 812). In other words, in some embodiments, as long as the drone is in (or within a predetermined distance of) the regulated space, the secondary control system retains control of the drone and/or the control of the drone by the primary control system continues to be interrupted.

The method 800 ends (step 814) with, for example, the drone traveling away from the regulated space under the control of the primary control system. The drone may then proceed to another destination, be manually controlled via a remote control system, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for managing drones, comprising:
    detecting a drone traveling toward a regulated space, the regulated space selectively activated according to at least one of weather conditions, a type of the drone, and an ownership of the drone, wherein during the detecting of the drone, the drone is being controlled by a first control system;
    interrupting said control of the drone by the first control system such that the drone does not travel into the regulated space while being controlled by the first control system;
    controlling the drone with a second control system such that the drone travels into the regulated space;
    generating an indication of the interrupting of said control of the drone by the first control system; wherein the indication includes a request to the first control system, by the second control system, for destination information of a destination associated with the drone; and
    providing the generated indication to the first control system; wherein, upon receiving the indication including the request, the first control system provides the destination information including instructions for traveling to the destination to the second control system.

2. The method of claim 1, wherein the second control system is remote from the first control system.

3. The method of claim 1, further including controlling the drone with the second control system such that drone travels out of the regulated space.

4. The method of claim 3, further including relinquishing control of the drone with the second control system after the drone travels out of the regulated space.

5. The method of claim 4, further including re-establishing control of the drone with the first control system after the drone travels out of the regulated space.

6. The method of claim 1, wherein the drone is an unmanned aerial vehicle (UAV).

7. A system for managing drones, comprising:
a processor that
    detects a drone traveling toward a regulated space, the regulated space selectively activated according to at least one of weather conditions, a type of the drone, and an ownership of the drone, wherein during the detecting of the drone, the drone is being controlled by a first control system;
    interrupts said control of the drone by the first control system such that the drone does not travel into the regulated space while being controlled by the first control system;
    controls the drone with a second control system such that the drone travels into the regulated space;
    generates an indication of the interrupting of said control of the drone by the first control system; wherein the indication includes a request to the first control system, by the second control system, for destination information of a destination associated with the drone; and
    provides the generated indication to the first control system; wherein, upon receiving the indication including the request, the first control system provides the destination information including instructions for traveling to the destination to the second control system.

8. The system of claim 7, wherein the second control system is remote from the first control system.

9. The system of claim 7, wherein the processor controls the drone with the second control system such that drone travels out of the regulated space.

10. The system of claim 9, wherein the processor relinquishes control of the drone with the second control system after the drone travels out of the regulated space.

11. The system of claim 10, wherein the processor re-establishes control of the drone with the first control system after the drone travels out of the regulated space.

12. The system of claim 7, wherein the drone is an unmanned aerial vehicle (UAV).

13. A computer program product for managing drones by a processor, the computer program product comprising a non-transitory computer-readable storage medium having computer-readable program code portions stored therein, the computer-readable program code portions comprising:
    an executable portion that detects a drone traveling toward a regulated space, the regulated space selectively activated according to at least one of weather conditions, a type of the drone, and an ownership of the drone, wherein during the detecting of the drone, the drone is being controlled by a first control system;
    an executable portion that interrupts said control of the drone by the first control system such that the drone does not travel into the regulated space while being controlled by the first control system;
    an executable portion that controls the drone with a second control system such that the drone travels into the regulated space;
    an executable portion that generates an indication of the interrupting of said control of the drone by the first control system; wherein the indication includes a request to the first control system, by the second control system, for destination information of a destination associated with the drone; and
    an executable portion that provides the generated indication to the first control system; wherein, upon receiving the indication including the request, the first control system provides the destination information including instructions for traveling to the destination to the second control system.

14. The computer program product of claim 13, wherein the second control system is remote from the first control system.

15. The computer program product of claim 13, wherein the computer-readable program portions further include an executable portion that controls the drone with the second control system such that drone travels out of the regulated space.

16. The computer program product of claim 15, wherein the computer-readable program portions further include an executable portion that relinquishes control of the drone with the second control system after the drone travels out of the regulated space.

17. The computer program product of claim 16, wherein the computer-readable program portions further include an executable portion that re-establishes control of the drone with the first control system after the drone travels out of the regulated space.

18. The computer program product of claim 13, wherein the drone is an unmanned aerial vehicle (UAV).

* * * * *